United States Patent [19]
Gilson

[11] Patent Number: 5,402,924
[45] Date of Patent: Apr. 4, 1995

[54] VISOR ATTACHMENT

[76] Inventor: Michael Gilson, 8593 E. Roanoke Rd., San Gabriel, Calif. 91775

[21] Appl. No.: 216,355

[22] Filed: Mar. 23, 1994

[51] Int. Cl.⁶ ............................................. B60J 3/00
[52] U.S. Cl. .................... 224/312; 224/311; 296/97.5; 296/97.6
[58] Field of Search .............. 224/311, 312; 296/37.7, 296/37.8, 97.5, 97.6

[56] References Cited
U.S. PATENT DOCUMENTS

| | | | |
|---|---|---|---|
| 1,837,537 | 12/1931 | Emerson | 224/311 |
| 2,211,879 | 8/1940 | Cave | 224/312 X |
| 2,377,225 | 5/1945 | Gisleson | 224/312 X |
| 2,453,843 | 11/1948 | Hanson | 296/97.5 X |
| 4,326,653 | 4/1982 | Stone | 224/312 |
| 4,391,053 | 7/1983 | Anthony | 224/312 X |
| 5,192,110 | 3/1993 | Mykytiuk et al. | 296/97.8 |

FOREIGN PATENT DOCUMENTS

| | | | |
|---|---|---|---|
| 0970196 | 1/1951 | France | 224/311 |
| 1452833 | 9/1966 | France | 296/97.6 |
| 0819199 | 10/1951 | Germany | 224/311 |
| 0002722 | of 1899 | United Kingdom | 224/311 |

Primary Examiner—J. Casimer Jacyna
Attorney, Agent, or Firm—J. E. Brunton

[57] ABSTRACT

A visor attachment which can be easily affixed to and removed from the visor of an automobile, truck or aircraft. The device includes a "U" shaped frame constructed from a moldable plastic, a stretchable mesh panel spanning the frame and a pair of elastic bands connected to the sides of the frame and adapted to encircle the visor in a manner to hold the attachment securely in place. The mesh panel is provided with a multiplicity of contiguous openings so that articles contained within the pouch can easily be seen.

4 Claims, 3 Drawing Sheets

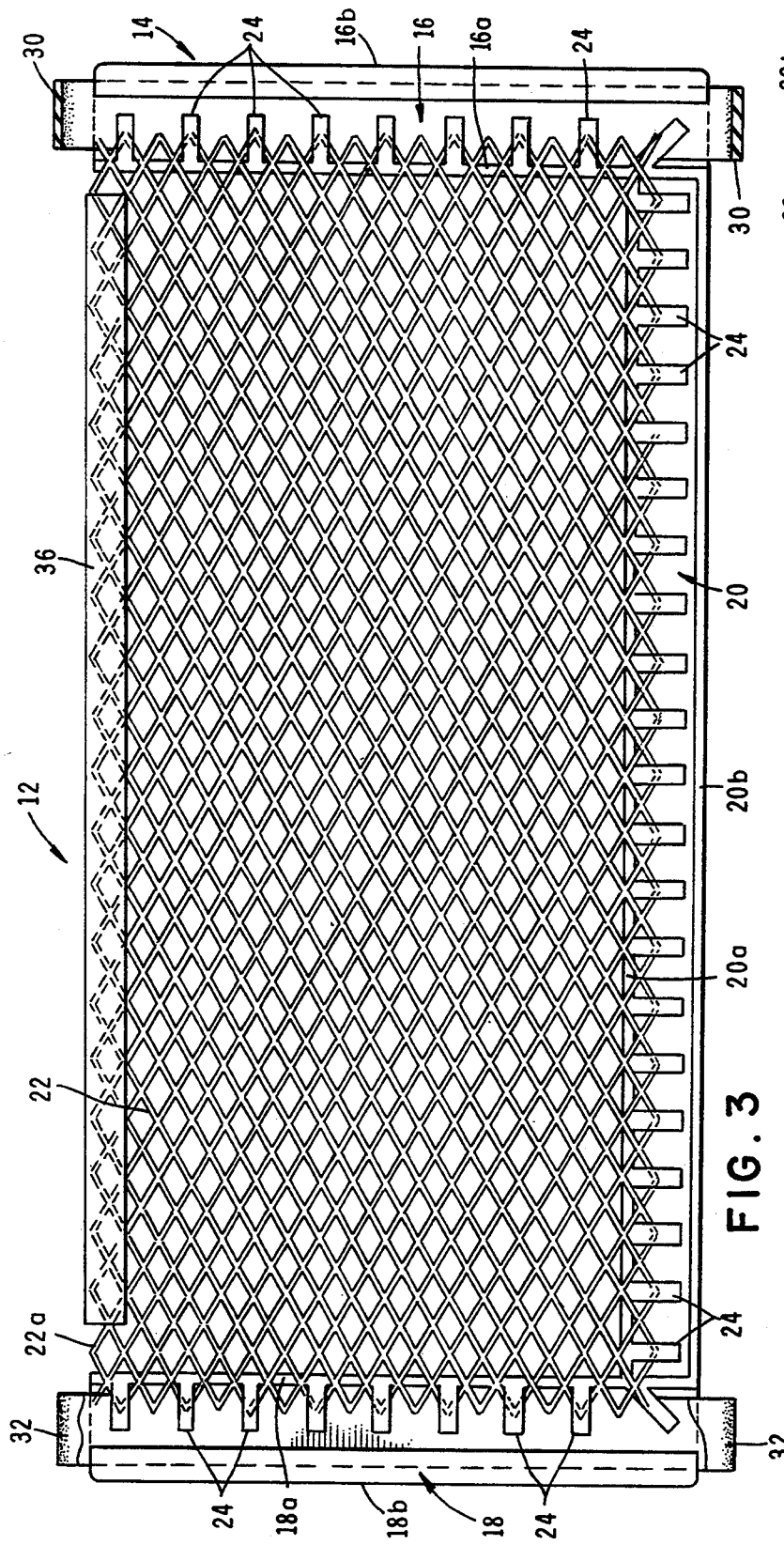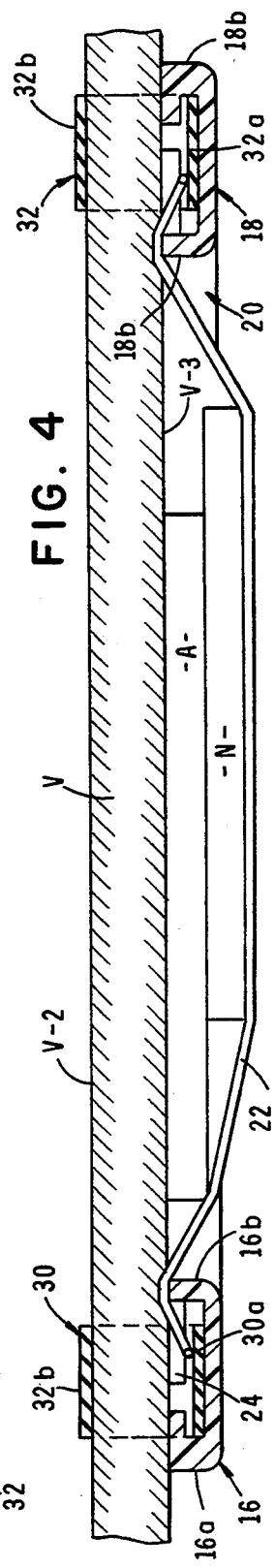

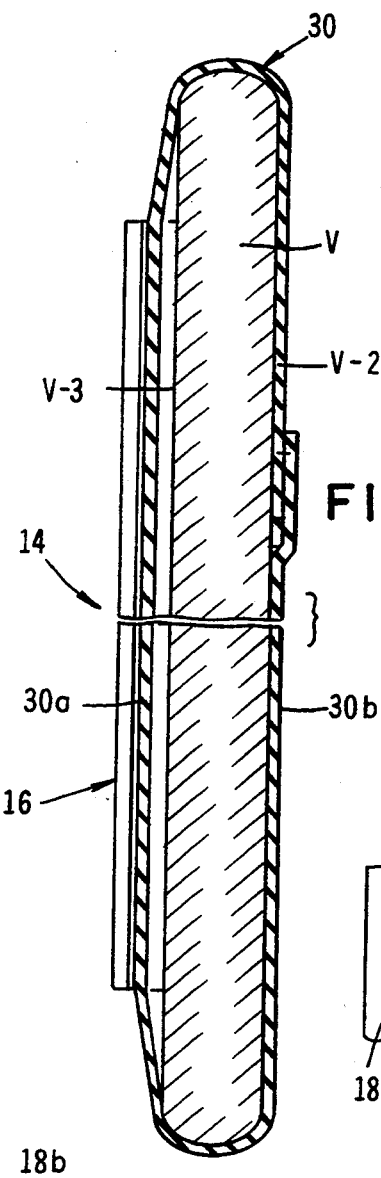
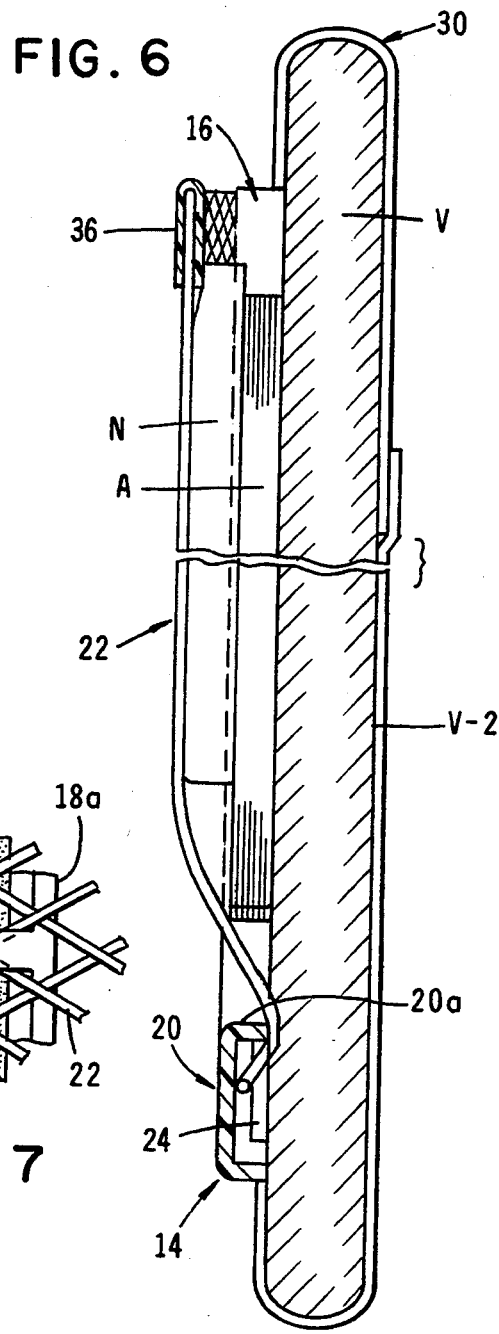
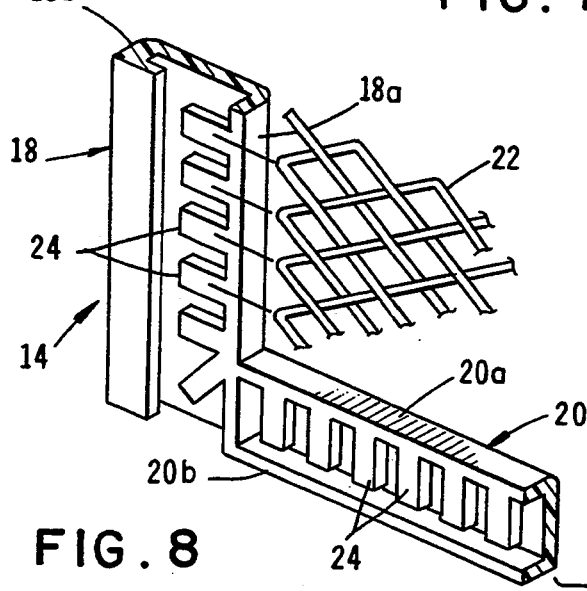
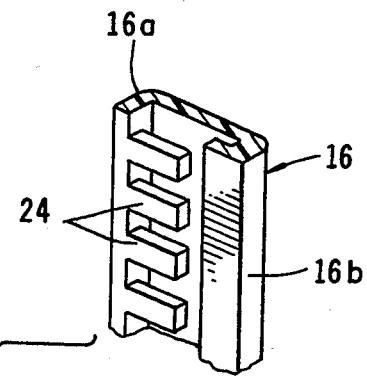

VISOR ATTACHMENT

BACKGROUND OF THE INVENTION

1. Field of the Invention

The present invention relates generally to visor attachments. More particularly, the invention concerns a pouch-like construction which can be removably affixed to an automobile visor or the like for use in retaining various articles such as automobile registrations, notebooks and various documents such that the articles are easily viewable through the open mesh-like wall of the pouch.

2. Discussion of the Invention

The prior art is replete with various types of automobile visor attachments. These prior art attachments typically include rather complex wallet-like devices having a number of pockets within which various articles can be placed. The devices are variously clipped, strapped or otherwise removably connected to the visor. Generally they are heavy, bulky awkward to use and typically inordinately expensive to manufacture.

Exemplary of prior art visor attachments are those described in U.S. Pat. No. 2,655,299, issued to Pfeifer; U.S. Pat. No. 2,673,670, issued to Steele; and U.S. Pat. No. 2,685,474, issued to Ingram. As will better be appreciated from the discussion which follows, the visor attachment of the present invention elegantly simplifies the problem of storing articles within visor attachments by providing a simple, inexpensive and easily usable visor attachment which enables easy viewing of articles contained within the pouch portion of the device.

In its simplest form, the visor attachment of the present invention comprises a "U" shaped frame constructed from a moldable plastic, a stretchable mesh panel spanning the frame and a pair of elastic bands connected to the sides of the frame and adapted to encircle the visor in a manner to hold the attachment securely in place. The mesh panel is provided with a multiplicity of contiguous openings so that articles contained within the pouch can easily be seen.

SUMMARY OF THE INVENTION

It is an object of the present invention to provide a storage pouch which can be easily affixed to and removed from the visor of an automobile, truck or aircraft and one which permits the user to easily place articles within the pouch and readily view the articles residing therewithin.

It is another object of the invention to provide a visor attachment of the aforementioned character that is lightweight, compact, very easy to use and extremely inexpensive to manufacture in quantity.

Another object of the invention is to provide a visor attachment of the character described which is constructed from a minimum number of component parts and includes elastic attachment straps that make its attachment to the visor both quick and easy.

Another object of the invention is to provide a visor attachment of the class described in the preceding paragraphs that is both attractive in appearance and extremely durable in use.

In summary, these and other objects of the invention are realized by a visor attachment comprising a plastic frame defining a generally "U" shaped opening, a stretchable mesh panel connected to the frame and spanning the opening and a pair of spaced-apart, elastically deformable visor receiving loops connected to the side portions of the frame.

BRIEF DESCRIPTION OF THE DRAWINGS

FIG. 3 is an enlarged front view of the visor attachment.

FIG. 4 is a cross-sectional view taken along lines 4—4 of FIG. 2.

FIG. 5 is a cross-sectional view taken along lines 5—5 of FIG. 2.

FIG. 6 is a cross-sectional view taken along lines 6—6 of FIG. 2.

FIG. 7 is a fragmentary, front view showing the manner of interconnection of the mesh facing with the body portion of the attachment.

FIG. 8 is a fragmentary, exploded, generally perspective view further illustrating the manner of attachment of the mesh facing to the body of the visor attachment.

DESCRIPTION OF THE INVENTION

Figure 1:
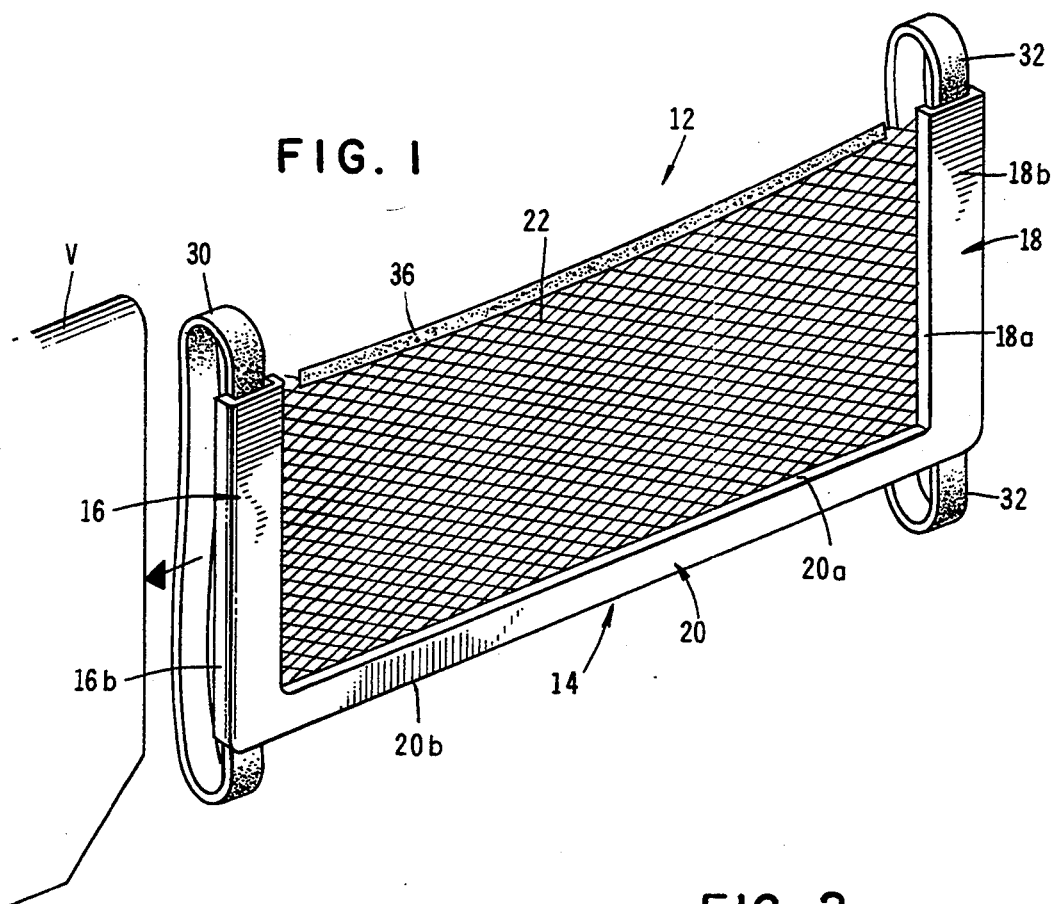
FIG. 1 is a generally perspective view of the visor attachment of the invention.
Figure 2:
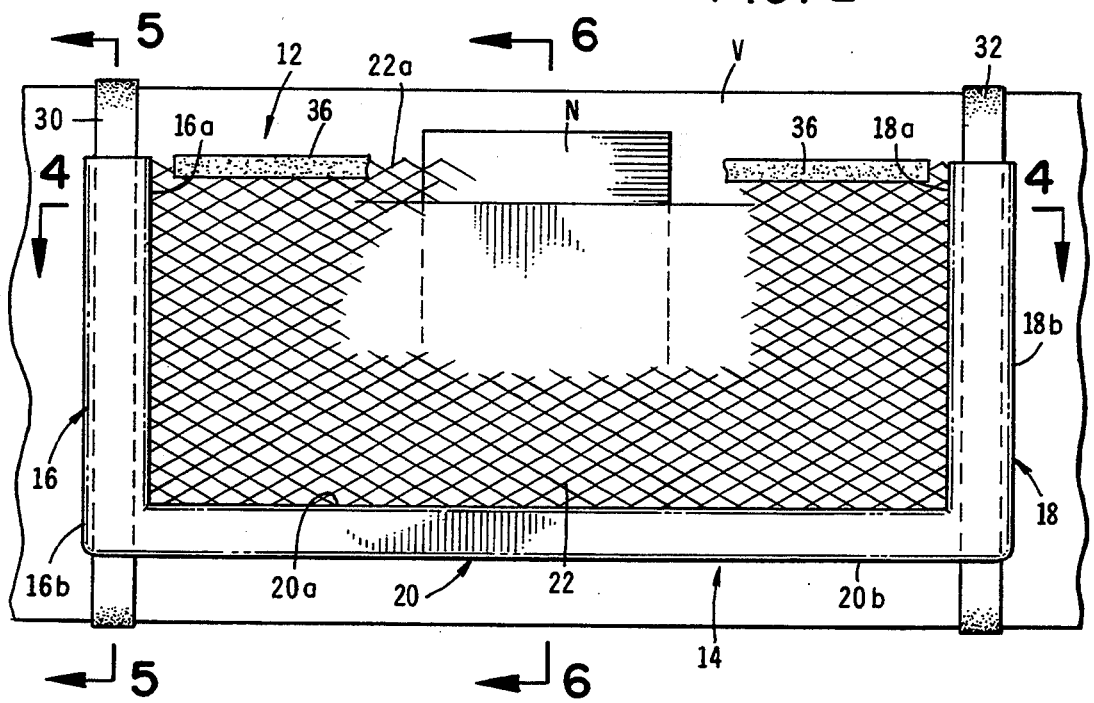
FIG. 2 is a front view of the visor attachment shown in position on a typical vehicle visor.

Referring to the drawings and particularly to FIGS. 1 through 3, one form of the visor attachment of the present invention is there illustrated and generally designated by the numeral 12. The visor attachment, which is adapted to be removably interconnected with a vehicle visor, such as a visor on an automobile or truck, comprises a generally U-shaped frame 14 preferably formed of a moldable plastic. Frame 14 comprises transversely spaced sides 16 and 18 which are integrally formed with a base portion 20. Sides 16 and 18 along with base portion 20 cooperate to define a generally U-shaped opening which is spanned by a stretchable, relatively coarse mesh panel 22.

As best seen by referring to FIGS. 3 and 8, sides 16 and 18, as well as base portion 20, are provided with a multiplicity of outwardly extending fingers 24 which comprise the mesh panel affixing means of the invention. As indicated in FIG. 8, base 20 and sides 16 and 18, are generally channel shaped in cross section and have interior walls 16a, 18a, and 20a respectively. As shown in the drawings, Fingers 24 are integrally formed with walls 16a, 18a, and 20a and extend outwardly toward external walls 16b, 18b, and 20b of the channel shaped members. Mesh panel 22 includes a multiplicity of contiguous openings with the peripherally disposed openings being receivable over fingers 24 in a manner to hold panel 22 taunt and securely in place on frame 14.

In order to removably connect the device to a visor, such as visor "V" (FIG. 1 and FIG. 2), connector means are provided, which here comprise first and second elastic connector bands 30 and 32 respectively. Bands 30 and 32 are formed of a stretchable elastic material so that they can be stretched over the visor "V" in the manner shown in FIG. 2. By also referring to FIG. 4, it can be seen that elastic band 30 is connected to side 16 of the frame while elastic band 32 is connected to side 18 of the frame. More particularly, one side of the loop-shaped band 30, designated in FIG. 4 by the numeral 30a, is closely receivable within channel-shaped side wall 16 while strap portion 32b is closely receivable within channel shaped side wall 18. The opposite sides of the band, namely sides 30b and 32b, pressurally engage the opposite face V-2 of the visor "V". With this construction, sides 16 and 18 of the frame will be maintained in continuous pressural contact with face V-3 of visor "V" (FIGS. 4 and 5).

Once the device is affixed to the visor, an article, such as a note pad "N", can be slid between the visor face and mesh panel 22 which elastically deforms outwardly to accept the note pad. Because of the coarseness of the mesh of panel 22, the note pad is easily visible to the vehicle driver by simply glancing toward the visor attachment. If desired a second article, such as a booklet "A", can be positioned between note pad "N" and the face of visor "V" in the manner shown in FIG. 6. Similarly, documents and like articles can readily be placed into the pouch portion of the visor attachment for secure storage and easy viewing.

To close and seal the upper edge 22a of mesh panel 22, there is provided an elongated binder strip 36. The binder strip can take the form of an elongated rubber bead or a length of tape that can be appropriately affixed to the upper margin of panel 22 as by adhesive bonding or the like. Strip 36 covers the exposed edges of the mesh and prevents snagging or damage to the panel as articles are inserted into the pouch portion of the device.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A visor attachment for removable interconnection with an automobile visor comprising:
   (a) a generally U-shaped frame formed of an injection moldable plastic, said frame having integrally formed side and base portions defining a generally U-shaped opening, said side and base portions having a multiplicity of integrally formed fingers;
   (b) a stretchable, course mesh panel having a multiplicity of contiguous openings, at least a plurality of which are receivable over said fingers of said frame and extending over said U-shaped opening; and
   (c) a pair of elastic bands, each having first and second ends connected to said frame to form a pair of spaced apart visor receiving loops.

2. A visor attachment as defined in claim 1 in which said side and base portions of said frame are generally channel shaped having spaced-apart side walls, said integrally formed fingers protruding from one of said spaced-apart side walls.

3. A visor attachment as defined in claim 2 in which said mesh panel further includes a top margin and an elastomeric binder connected to said top margin.

4. A visor attachment for removable interconnection with an automobile visor comprising:
   (a) a generally U-shaped frame formed of an injection moldable plastic, said frame defining a generally U-shaped opening, said frame having a plurality of spaced-apart connector tabs;
   (b) a stretchable, course mesh panel having a top margin, a bottom margin and a pair of side margins provided with spaced-apart openings within which said connector tabs are receivable, said mesh panel also having a multiplicity of contiguous openings connected to said frame and extending over said U-shaped opening and an elastomeric binder connected to said top margin; and
   (c) a pair of elastic bands, each having first and second ends connected to said frame to form a pair of spaced apart visor receiving loops.

* * * * *